United States Patent [19]

Yee et al.

[11] Patent Number: 5,376,875

[45] Date of Patent: Dec. 27, 1994

[54] BATTERY CHARGER STATUS MONITOR CIRCUIT AND METHOD THEREFOR

[75] Inventors: Renwin J. Yee, Chandler; Jefferson W. Hall, Phoenix; Thomas D. Petty, Tempe, all of Ariz.

[73] Assignee: Motorola, Inc., Schaumburg, Ill.

[21] Appl. No.: 160,764

[22] Filed: Dec. 3, 1993

[51] Int. Cl.5 .................................................. H02J 7/04
[52] U.S. Cl. ............................................. 320/21; 320/44
[58] Field of Search ..................... 320/21, 37, 38, 39, 320/40, 43, 44

[56] References Cited

U.S. PATENT DOCUMENTS

| | | | |
|---|---|---|---|
| 3,944,904 | 3/1976 | Hase | 320/21 X |
| 4,016,473 | 4/1977 | Newman | 320/21 X |
| 4,237,411 | 12/1980 | Kothe et al. | 320/21 |
| 4,554,500 | 11/1985 | Sokira | 320/21 X |
| 4,679,000 | 7/1987 | Clark | 320/44 X |
| 4,912,392 | 3/1990 | Faulkner | 320/44 |
| 5,248,928 | 9/1993 | Gilmore | 320/21 X |

Primary Examiner—Kristine L. Peckman
Attorney, Agent, or Firm—Gary W. Hoshizaki

[57] ABSTRACT

A battery charger status monitor circuit (40) for monitoring the status of a battery (12) charged with current pulses. The current pulses charging the battery (12) are reduced in frequency and duty cycle as the battery approaches a fully charged condition. By monitoring the number of current pulses charging the battery within a predetermined time period, the charge status of the battery (12) is determined. If no pulses are detected within the predetermined time period, the battery (12) is fully charged. A counter (47) is incremented by a clock signal. A charge signal resets the counter (47). The charge signal corresponds to the current pulses charging the battery. If the counter (47) reaches a predetermined count, the clock and charge signals are disabled. Reaching the predetermined count before resetting indicates the battery (12) is fully charged. When the counter is below the predetermined count, the battery (12) is being charged.

20 Claims, 2 Drawing Sheets

5,376,875

BATTERY CHARGER STATUS MONITOR CIRCUIT AND METHOD THEREFOR

BACKGROUND OF THE INVENTION

This invention, in general, relates to battery charge sensing circuits, and more particularly to, monitoring circuits for a battery charger.

Battery chargers for nickel cadmium batteries have been in use for many years and are well known by one skilled in the art. Battery chargers of this type were extremely simple in design and manufacture. Circuitry included of a full wave bridge rectifier that coupled directly to the battery. The voltage of a charging battery would eventually increase until its voltage was greater than or equal to the full wave bridge at which point charging would cease.

There are more sophisticated chargers that rapidly charge both Nickel Cadmium and Nickel Metal Hydride batteries. A typical feature of these types of chargers is that they monitor a change in battery voltage or a change in battery temperature while charging to determine when charging should be terminated. The battery is charged with a constant current., thus the battery voltage or temperature is monitored as a function of time to determine rates of change.

Nickel Cadmium and Nickel Metal Hydride batteries have a very low internal impedance, for example, 50 milliohms. High charging currents do not produce significant changes in measured battery voltage when either charging or not charging due to the low internal impedance. Typically, the battery voltage is monitored while continuously charging the battery. The charging voltage remains flat for a portion of a charging cycle. The battery voltage then rises, plateaus, and finally decreases. It is this decrease in charging voltage as a function of time that signals termination in the charging cycle.

A second method commonly used to determine a charge status of a battery is to monitor the temperature of a battery as a function of time. Nickel Cadmium and Nickel Metal Hydride batteries have a characteristic that when they reach the end of the charge period the temperature of the battery increases greatly. This sudden increase in temperature is monitored and used to end the battery charging cycle.

In the quest for reducing battery cost, increasing reliability, and providing an environmentally friendly battery, rechargeable alkaline batteries have been developed. Rechargeable alkaline batteries have significantly different characteristics than rechargeable Nickel Cadmium or Nickel Metal Hydride batteries such that standard battery chargers cannot be used. One such characteristic is a high internal resistance which may range from 1 to 5 ohms. A high resistance would not yield an accurate measurement of the battery voltage during high current charging. Rechargeable alkaline batteries are charged with a pulsed current. Battery voltage is measured between current pulses (no battery charging) for accurate measurement. Traditional methods for determining when a battery is fully charged are not applicable to a pulsed charged system.

It would be of great benefit if a battery charger status monitor circuit could be provided which accurately determines when a battery is charged in a pulsed battery charger system.

DETAILED DESCRIPTION OF THE DRAWINGS

Figure 1:
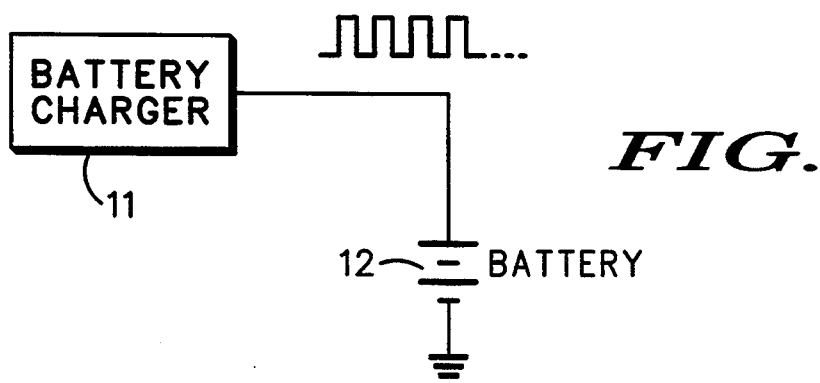
FIG. 1 is a diagram of a pulsed battery charger and a battery.

FIG. 1 is a diagram of a pulsed battery charger 11 charging a battery 12. Charging with current pulses is required for batteries comprising certain technologies, for example, rechargeable alkaline. The magnitude of these current pulses provided by pulsed battery charger 11 can vary significantly but 100 to 500 milliamperes is commonly used for household battery types. In the preferred embodiment, circuitry within pulsed battery charger 11 monitors the charge status of battery 12 and modulates both the pulse width of the current pulses and the frequency of current pulses. The magnitude of the current charging battery 12 can also be controlled.

Figure 2:
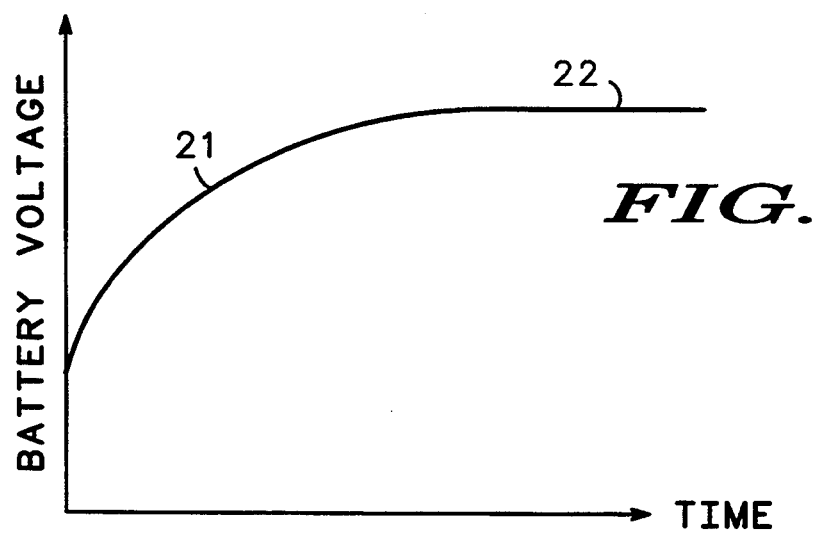
FIG. 2 is a graph of a voltage of the battery of FIG. 1 being charged as a function of time.

FIG. 2 is a graph of battery 12 (FIG. 1) being charged by pulsed battery charger 11 (FIG. 1) as a function of time. The voltage of battery 12 is initially at its lowest point prior to charging. Charging increases the voltage on battery 12 as indicated by a curved section 21. During the final stages of charging the voltage of battery 12 asymptotically approaches its final value as indicated by a plateau section 22.

Figure 3:
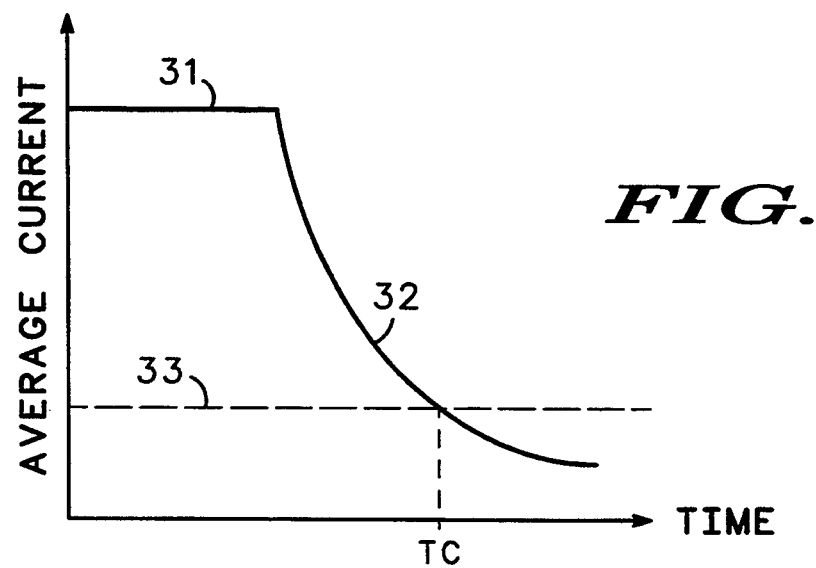
FIG. 3 is a graph of average current charging the battery of FIG. 1 as a function of time.

FIG. 3 is a graph of current from pulsed battery charger 11 (FIG. 1) charging battery 12 (FIG. 1) as a function of time. The average amount of current delivered to the battery changes with time as shown in FIG. 3.

In the preferred embodiment, battery 12 is initially charged with a maximum current and duty cycle which provides the largest average current indicated by a flat section 31. This corresponds to curved section 21 of FIG. 2 where the voltage of battery 12 rises.

The average charging current falls as indicated by a curved section 32 as the battery 12 approaches full charge 32. This corresponds to plateau section 22 of FIG. 2. Battery 12 is fully charged when the average current charging the battery reaches a level indicated by dotted line 23 and a time TC. In the preferred embodiment, average current is reduced in curved section 32 by either reducing pulse duty cycle, skipping pulses, or a combination of both. The duty cycle of the pulses is reduced to a level that coincides with skipping one out of a number of pulses. This process is repeated, each time increasing the number of skipped pulses, thus reducing average current. Battery 12 is approaching its fully charged level during curved section 32 (as the average charging current is being reduced).

Figure 4:
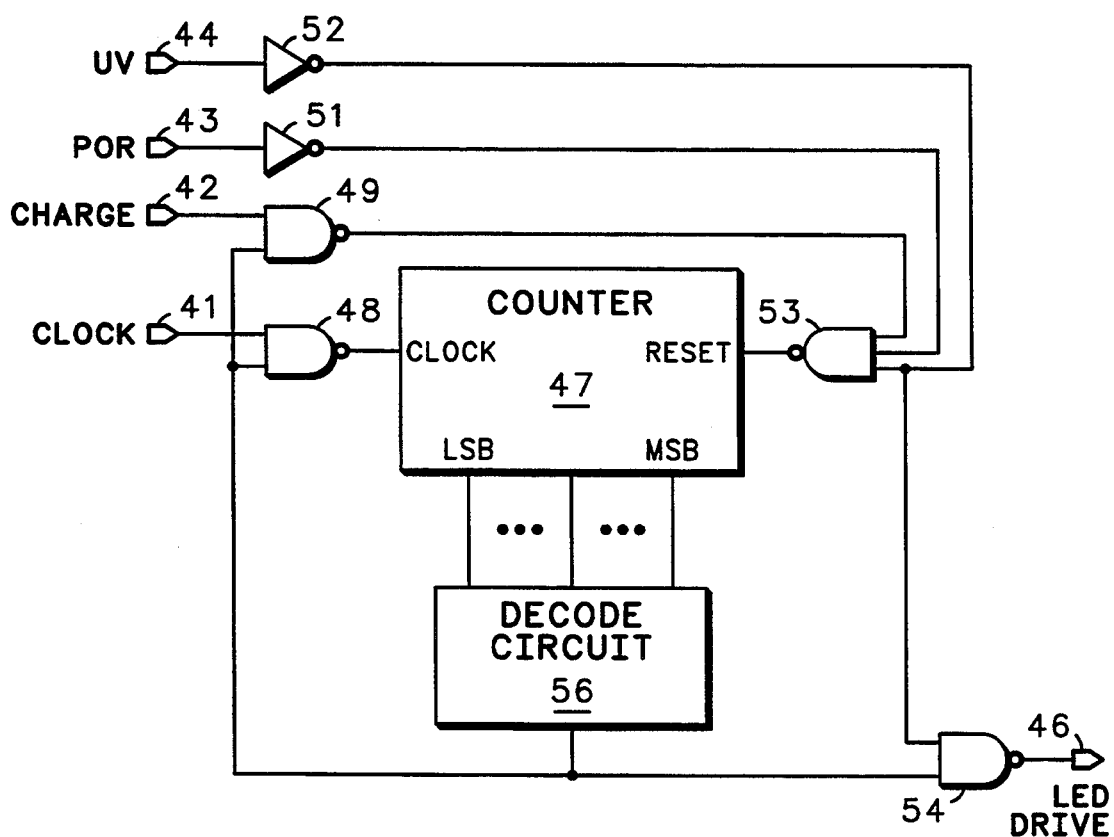
FIG. 4 is a schematic diagram of a battery charger monitor circuit in accordance with the present invention.

FIG. 4 is a schematic diagram of a battery charger status monitor circuit 40. Battery charger status monitor circuit 40 is capable of indicating the battery charge state (charging or full charged) even though a battery charges asymptotically to its final charge point. Battery charger status monitor circuit 40 works in conjunction with a pulsed battery charger circuit similar to that described in FIG. 1. For example, battery charger status monitor circuit 40 can be used to sense the charge state of a battery and provide a signal to the battery charger to stop charging and also provide a visual output to a user that the battery is charged.

Battery charger status monitor circuit 40 has a UV (undervoltage) input 44, a POR (power on reset) input 43, a charge input 42, a clock input 41, and a LED (light emitting diode) drive output 46. Battery charger status monitor circuit 40 comprises inverters 51 and 52, NAND gates 48, 49, and 53, AND gate 54, counter 47, and decode circuit 56.

Counter 47 includes a clock input, a reset input, and a plurality of outputs (LSB—least significant bit to MSB—most significant bit). In this embodiment, decode circuit 56 has inputs coupled the outputs of counter 47 and an output. MANE, gate 48 has a first input coupled to clock input 41, a second input coupled to the output of decode circuit 56, and an output coupled to the clock input of counter 47. Inverter 52 has an input coupled to UV input 44 and an output. Inverter 51 has an input coupled to POR input 43 and an output. NAND gate 49 has a first input coupled to charge input 42, a second input coupled to the output of decode circuit 56, and an output. NAND gate 53 has a first input coupled to the output of inverter 52, a second input coupled to the output of inverter 51, a third input coupled to the output of NAND gate 49, and an output coupled to the reset input of counter 47. AND gate 54 has a first input coupled to the output of inverter 52, a second input coupled to the output of decode circuit 56, and an output coupled to LED drive output 46.

Operation of battery charger monitor circuit 40 works by sensing or detecting the current pulses provided by a battery charger to a battery being charged. Sensing occurs over a predetermined time period. The battery is not fully charged if current pulses are detected within the predetermined time period. The battery is fully charged if no current pulses are detected within the predetermined time period.

In the preferred embodiment, battery charger status monitor circuit 40 monitors the charge status of a battery based on the average current delivered to the battery. Battery charger status monitor circuit 40 counts a consecutive number of missing current pulses over a predetermined time and indicates the status of the battery. A one or high logic level at LED drive output 46 indicates the battery is charging. A zero or low logic level at LED drive output 46 indicates a charged battery. In the preferred embodiment, LED drive output 46 couples to a light emitting diode (not shown) that when lit (one logic level at LED drive output 46) indicates a charging battery.

Counter 47 is clocked through NAND gate 48 from a clock signal applied to clock input 41. In the preferred embodiment, the clock signal has a frequency that corresponds to the maximum frequency of the current pulses charging the battery. Counter 47 is reset by NAND gate 53 in response to an undervoltage signal, power on reset signal, and charge signal applied respectively to UV input 44, POR input 43, and charge input 42. Decoder circuit 56 provides a signal indicating when counter 47 reaches a predetermined count. Both counters and decoders are well known in the art. It should be obvious to one skilled in the art that the number of outputs needed for counter 47 can vary depending on the application. Also, decode circuit 56 can be implemented in many ways depending on the predetermined count to be decoded.

A power on reset signal is applied when power is applied to a battery charger circuit (for example, battery charger 11 of FIG. 1). Under normal operating conditions the power on reset signal is in a zero logic state. The power on reset signal initializes battery charger status monitor circuit 40 (under power up) by providing a one logic level pulse to inverter 51. NAND gate 53 receives a signal from inverter 51 resetting the outputs of counter 47 to zero logic levels.

The undervoltage signal applied to UV input 44 indicates a low voltage on a battery or when no battery is present in the charger. Under normal operating conditions (the battery is not undervoltage) the undervoltage signal is at a zero logic level. A battery low voltage condition exists when the voltage of the battery is below a predetermined threshold voltage. This is signified by the undervoltage signal in a one logic level. The one logic level is inverted by inverter 52 and received by NAND gate 53 which resets counter 27. The one logic level applied to UV input 44 also generates a zero logic level at output 46 that indicates a no charge condition.

The charge signal applied to charge input 42 corresponds a current pulse charging the battery such as that provided at the output of battery charger 11 of FIG. 1. In the preferred embodiment, the charge signal is at a one logic level during a current pulse. A one logic level applied to charge input 42 resets counter 47 through NAND gates 49 and 53.

The clock signal applied to input 41 increments counter 47. In the preferred embodiment, the clock signal frequency corresponds to the maximum current pulse frequency of the battery charger. Maximum current frequency and duty cycle is applied during initial battery charging. This corresponds to curved section 21 of FIG. 2 or flat section 31 of FIG. 3. Under this condition, counter 47 is always reset before incrementing the MSB of counter 47. Assuming the power on reset signal and the undervoltage signal are both at zero logic levels, the MSB of counter 47 will remain at a zero logic level. AND gate 54 outputs a one logic level indicating battery charging.

As battery voltage rises during charging the current pulse duty cycle and frequency is reduced. This is indicated by the average charging current being reduced in curved section 32 of FIG. 3. The reduced frequency will allow counter 47 to be incremented to higher counts before being reset.

At some point the reduced frequency will allow the clock signal to increment counter 47 to the MSB output. The point at which this occurs is indicated by dashed line 33 of FIG. 3. When the MSB output of counter 47 transitions to a one logic level it will disable the clock signal from clocking counter 47 (via NAND gate 48) and disable the charge signal from resetting counter 47 (via NAND gate 49). AND gate 54 will transition from the one logic level to a zero logic level indicating a charged battery.

By now it should be appreciated that a battery charger status monitor circuit has been provided that indicates when a battery is charged by a pulsed battery charger.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A method for monitoring a charge level on a battery, the battery being charged with current pulses, the method comprising:
   incrementing a counter with a clock signal;
   resetting said counter with a charge signal corresponding to the current pulses for charging the battery; and
   disabling said clock signal and said charge signal from respectively incrementing and resetting said counter when said counter reaches at a predetermined count.

2. A method as recited in claim 1 further including indicating the battery is charging when said counter is below said predetermined count.

3. A method as recited in claim 2 wherein said step of indicating includes enabling a light emitting diode when said counter is below said predetermined count for indicating the battery is charging.

4. A method as recited in claim 3 further including indicating the battery is charged when said counter reaches said predetermined count.

5. A method as recited in claim 4 wherein said step of indicating the battery is charged includes disabling said light emitting diode for indicating the battery is charged.

6. A method as recited in claim 1 wherein said step of incrementing said counter includes choosing said clock signal having a frequency substantially equal to a maximum frequency of said current pulses charging the battery.

7. A method as recited in claim 1 further including a step of resetting said counter when power is applied to said counter.

8. A method as recited in claim 1 further including
   detecting when a voltage of the battery is less than a predetermined voltage;
   holding said counter reset until said voltage of the battery is greater than said predetermined voltage; and
   disabling said light emitting diode until said voltage of the battery is greater than said predetermined voltage.

9. A method for monitoring a charge level on a battery, the battery being charged with current pulses, the method comprising:
   sensing a first current pulse for charging the battery;
   indicating the battery is charging when a second current pulse is detected within a predetermined time period after said first current pulse is sensed; and
   indicating the battery is charged when second current pulse is not detected within said predetermined time period after said first current pulse is sensed.

10. A method as recited in claim 9 wherein said step of sensing a first current pulse includes
    incrementing a counter with a clock signal;
    resetting said counter with a charge signal when said second current pulse is sensed; and
    disabling said clock signal and said charge signal from respectively incrementing and resetting said counter at a predetermined count.

11. A method as recited in claim 10 wherein said step of indicating the battery is charging includes enabling a light emitting diode to indicate the battery is charging when said counter is below said predetermined count.

12. A method as recited in claim 11 wherein said step of indicating the battery is charged includes disabling said light emitting diode to indicate the battery is charged when said counter reaches said predetermined count.

13. A method as recited in claim 12 further including detecting a voltage of the battery is below a predetermined voltage; holding said counter reset; and disabling said light emitting diode.

14. A method as recited in claim 9 further including resetting said counter after power is initially applied to said counter.

15. A battery charger status monitor circuit for monitoring a charge level of a battery, the battery is charged with current pulses, the battery status monitor circuit comprising:
    a counter;
    a first logic circuit responsive to a clock signal for incrementing said counter;
    a second logic circuit responsive to a charge signal for resetting said counter, said charge signal corresponding to said current pulses for charging the battery; and
    a decode circuit responsive to said counter for disabling said first and second logic circuits from respectively incrementing and resetting said counter when said counter reaches a predetermined count.

16. A battery charger status monitor circuit as recited in claim 15 further including
    a third logic circuit responsive to said decode circuit and said second logic circuit for indicating the battery is charging when said counter is below said predetermined count and for indicating the battery is charged when said counter reaches said predetermined count.

17. A battery charger status monitor circuit as recited in claim 15 wherein said clock signal has a frequency substantially equal to a maximum frequency of the current pulses for charging the battery.

18. A battery charger status monitor circuit as recited in claim 15 wherein said counter is held reset when a voltage of the battery is below a predetermined voltage.

19. A battery charger status monitor circuit as recited in claim 15 wherein said counter is reset when said counter first receives power.

20. A battery charger status monitor circuit as recited in claim 15 wherein said counter includes a clock input, a reset input, and a plurality of outputs for indicating a count, wherein said first logic circuit comprises a NAND gate having a first input coupled for receiving said clock signal, a second input, and an output coupled to said clock input of said counter, wherein said second logic circuit comprises a NAND gate having a first input coupled for receiving said charge signal, a second input, and an output coupled to said reset input of said counter, and wherein said decode circuit includes a plurality of inputs coupled to said plurality of outputs of said counter and an output coupled said second input of said NAND gate of said first logic circuit and said second input of said NAND gate of said second logic circuit.

* * * * *